US010399123B2

(12) United States Patent
Ivanoff (10) Patent No.: US 10,399,123 B2
(45) Date of Patent: Sep. 3, 2019

(54) METHOD AND APPARATUS FOR WASHING AND GRADING SAND AND AGGREGATE

(71) Applicant: CDE Global Limited, Cookstown, County Tyrone (GB)

(72) Inventor: Enda Ivanoff, Moy (GB)

(73) Assignee: CDE Global Limited, Cookdstown, County Tyrone (GB)

( * ) Notice: Subject to any disclaimer, the term of this patent is extended or adjusted under 35 U.S.C. 154(b) by 0 days.

(21) Appl. No.: 15/907,795

(22) Filed: Feb. 28, 2018

(65) Prior Publication Data

US 2018/0243796 A1 Aug. 30, 2018

(30) Foreign Application Priority Data

Feb. 28, 2017 (GB) .................................. 1703226.9

(51) Int. Cl.
*B07B 1/00* (2006.01)
*B07B 1/28* (2006.01)
(Continued)

(52) U.S. Cl.
CPC ................ *B07B 1/005* (2013.01); *B07B 1/28* (2013.01); *B07B 1/4663* (2013.01); *B07B 11/06* (2013.01);
(Continued)

(58) Field of Classification Search
CPC ......... B07B 1/005; B07B 1/28; B07B 1/4663; B07B 11/06; E21B 21/065; B65G 47/20
(Continued)

(56) References Cited

U.S. PATENT DOCUMENTS 4,386,519 A * 6/1983 Sinkey ...................... B04C 5/00
209/726
4,745,096 A * 5/1988 Keogh ................... B01D 39/06
127/55
(Continued)

FOREIGN PATENT DOCUMENTS

CN 105855071 8/2016
CN 205914384 2/2017
(Continued)

OTHER PUBLICATIONS

UK Search Report dated Jul. 11, 2017 for corresponding UK Application No. GB1703226.9.
(Continued)

*Primary Examiner* — Terrell H Matthews
(74) *Attorney, Agent, or Firm* — Gardner, Linn, Burkhart & Ondersma LLP (57) ABSTRACT

An apparatus for washing and grading sand and aggregate includes a first multi-deck screen and a sump for collecting undersize material from the plurality of decks. A first set of hydrocyclones receives undersize material and water from the sump of the first screen. A second screen has a deck for producing at least one sand product and a sump beneath the deck, the deck of the second screen receiving an underflow from each cyclone of the first set of hydrocyclones. A second set of hydrocyclones receives undersize material and water from the sump of the second vibratory screen. The deck of a third screen receives an underflow from each cyclone of the second set of hydrocyclones. A further hydrocyclone receives undersize material and water from the sump of the third screen, and an underflow from the further hydrocyclone is delivered onto the deck of the third screen.

16 Claims, 4 Drawing Sheets

(51) Int. Cl.
*E21B 21/06* (2006.01)
*B07B 1/46* (2006.01)
*B07B 11/06* (2006.01)
*B65G 47/20* (2006.01)

(52) U.S. Cl.
CPC ........ *E21B 21/065* (2013.01); *B07B 2201/04* (2013.01); *B07B 2230/01* (2013.01); *B65G 47/20* (2013.01)

(58) Field of Classification Search
USPC .................. 209/233, 235, 311, 314, 315
See application file for complete search history.

(56) References Cited

U.S. PATENT DOCUMENTS

| | | | |
|---|---|---|---|
| 4,802,976 A * | 2/1989 | Miller | .................... B03B 9/005 |
| | | | 209/166 |
| 6,079,568 A * | 6/2000 | Loshe | ................ B01D 33/0353 |
| | | | 209/311 |
| 9,643,115 B2 | 5/2017 | Convery | |
| 9,776,214 B2 | 10/2017 | Vallelly et al. | |
| 2005/0045535 A1 * | 3/2005 | Fendley | ............. B01D 21/0039 |
| | | | 210/97 |
| 2007/0221410 A1 | 9/2007 | Butler et al. | |
| 2014/0345649 A1 * | 11/2014 | Jung | ........................ B09C 1/02 |
| | | | 134/13 |

FOREIGN PATENT DOCUMENTS

| | | |
|---|---|---|
| JP | 2015217386 A | 12/2015 |
| KR | 20090033529 | 4/2009 |
| KR | 101619463 | 5/2016 |

OTHER PUBLICATIONS

European Search Report of corresponding EP Application No. EP18157434, dated Dec. 17, 2018.

* cited by examiner

METHOD AND APPARATUS FOR WASHING AND GRADING SAND AND AGGREGATE

FIELD OF THE INVENTION

This invention relates to a method and apparatus for washing and grading sand and aggregate, and in particular to a method and apparatus for washing and grading sand and aggregate with a high throughput yet low turbidity/low fines content in sand products.

BACKGROUND OF THE INVENTION

The term "aggregates" is generally used to describe a broad category of coarse particulate material used in construction, including sand, gravel and crushed stone. Aggregates are the most mined materials in the world. Aggregates are typically washed and graded on a combination of vibrating screens and hydrocyclones to produce washed aggregate products having a predetermined grain size or range of grain size. The term "aggregate" is more typically used to describe particulate material having a grain size of over 6 mm while the term "sand" is typically used to describe particulate having a grain sand of between 0.075 mm and 6 mm and such terminology will be used to describe such particulate material hereinafter.

A typical vibrating screen comprises a frame, defined by a pair of substantially parallel side walls interconnected by transversely extending bridging members, upon which is mounted one or more polyurethane decks having small openings or slots for water and undersize particles to pass through. The frame is typically mounted on a base via resilient linkages and the frame, and thus the deck or decks are typically vibrated by means of a pair of counter rotating rotors defining eccentric masses, driven by one or more drive motors, to impart circular or reciprocating vibrating motion to the deck(s).

Such screens can be used for grading and/or dewatering particulate material, oversize material passing over the deck(s) of the screen to be collected from a downstream end of the screen while water and undersize material is collected in a sump of the screen for subsequent processing.

A hydrocyclone is a device used to separate particles in a liquid suspension based on the ratio of their centripetal force to fluid resistance. This ratio is high for coarse particles and low for fine particles. A hydrocyclone typically comprises a cylindrical section having an inlet for supplying a feed slurry into the hydrocyclone tangentially, and a conical base. Outlets are provided at upper and lower ends of the hydrocyclone. Underflow, containing the coarser fraction, passes out of the lower outlet while overflow, containing the finer fraction and most of the water, passes out of the outlet at the upper end of the hydrocyclone. Thus, as well as removing fine contaminants, a hydrocyclone also serves to reduce the water content of a sand/water slurry.

Hydrocyclones are often used in combination with vibratory screens for washing and dewatering sand, a slurry of sand and water being cleaned and dewatered in one or more hydrocyclones before the sand, contained in the underflow from the hydrocyclones, is delivered onto a deck of a vibratory screen for grading and/or further dewatering.

Most sand and aggregate washing and grading plants are very large, including different stages comprising multiple grading and dewatering screens and hydrocyclones, and typically require a large volume of water to fluidise the material in each stage of the process and to transfer the material between different stages of the process. For washing and grading plants designed to produce one or more grades of aggregate and one or more grades of sand, the throughput of the plant (in terms of tonnes of material processed per hour) is typically limited by the sand washing and grading part of the plant, typically due to limitations imposed by the pumps, hydrocyclones and screens used to wash and grade the sand. Furthermore, when adapted for high throughput (typically requiring a high volume of water), the sand washing and grading process tends to operate with a high turbidity due to difficulties in removing fines at high sand flow rates.

SUMMARY OF THE INVENTION

The present invention provides a particularly adaptable apparatus and method of operation thereof, which can produce up to three different grades of washed aggregate and one or more grades of sand with high throughput, low turbidity and low water consumption.

According to a first aspect of the present invention, there is provided an apparatus for washing and grading sand and aggregate comprising a first vibratory screen having a plurality of vertically stacked decks for producing a plurality of aggregate products therefrom and a sump for collecting undersize material comprising sand and water from the plurality of decks; a first set of hydrocyclones arranged to receive undersize material and water from the sump of the first vibratory screen, the first set of hydrocyclones, comprising a plurality of cyclones arranged in parallel, each having an inlet receiving the undersize material and water from the sump of the first vibratory screen; a second vibratory screen having a deck for producing at least one sand product and a sump beneath the deck for receiving undersize material and water from the deck of the second vibratory screen, the deck of the second vibratory screen receiving an underflow from each cyclone of the first set of hydrocyclones; a second set of hydrocyclones arranged to receive undersize material and water from the sump of the second vibratory screen, the second set of hydrocyclones comprising a plurality of cyclones arranged in parallel, each having an inlet receiving the undersize material and water from the sump of the second vibratory screen; a third vibratory screen having a deck for producing at least one sand product and a sump beneath the deck for receiving undersize material and water from the deck of the third vibratory screen, the deck of the third vibratory screen receiving an underflow from each cyclone of the second set of hydrocyclones; and a further hydrocyclone receiving undersize material and water from the sump of the third vibratory screen, an underflow from the further hydrocyclone being delivered onto the deck of the third vibratory screen.

The first vibratory screen may be mounted on a first end of the chassis and the second and third grading screens may be mounted on a second end of the chassis, opposite the first end.

In another aspect, the first vibratory screen comprises a triple deck screen for producing three separate grades of aggregate. The first vibratory screen may comprise substantially parallel upper, intermediate and lower decks mounted on a frame defined by a pair of substantially parallel side walls interconnected by transversely extending bridging members and incorporating a vibration generator or vibration generating means for imparting vibratory motion to the screen. Optionally, each deck of the first vibratory screen is inclined downwardly from an upper receiving end to a lower discharge end at which over-sized material (relative to the screen deck concerned) can be discharged.

Each of the upper, intermediate and lower screen decks may incorporate a plurality of slots or apertures formed therein for water and/or undersize particles to pass through, the openings or slots in the upper deck being larger than those of the intermediate deck, which are in turn larger than those of the lower deck.

A first stockpile belt conveyor may be mounted on the chassis arranged to receive over-sized material from the discharge end of the lower deck of the first vibratory screen, the first stockpile conveyor extending laterally from the chassis to a first side of the chassis, substantially perpendicular to a longitudinal axis of the first vibratory screen, a loading end of the first stockpile conveyor being located directly beneath the discharge end of the lower deck of the aggregate grading screen, a second stockpile conveyor being mounted on the chassis to receive over-sized material from the discharge end of the intermediate deck of the first vibratory screen, the second stockpile conveyor extending laterally from the chassis, perpendicular to the first vibratory screen, to a second side of the chassis, opposite the first side of the chassis, such that the second stockpile conveyor extends parallel to and in an opposite direction to the first stockpile conveyor, a third stockpile conveyor being arranged to receive over-sized material from the discharge end of the upper deck of the first vibratory screen, the third stockpile conveyor extending at an angle of approximately 45° to the first stockpile conveyor and to the longitudinal axis of the chassis.

Each of the second and third vibratory screens may comprise a frame mounted upon the chassis via resilient mounts or mounting means and upon which is mounted a screening surface having a plurality of apertures therein for grading and dewatering aggregate, the frame being provided with a vibration generator or vibration generating means for imparting vibration to the frame, and sump beneath the screening surface for receiving water and undersize material therefrom.

Optionally, the sump of the first vibratory screen is associated with at least one pump configured to pump water and undersize material therefrom to a respective inlet of each cyclone of the first set of hydrocyclones, the sump of the second vibratory screen being associated with a pump configured to pump water and undersize material therefrom to a respective inlet of each cyclone of the second set of hydrocyclones.

An overflow from the further hydrocyclone, being relatively clean, may be supplied to material on the first vibratory screen. The overflows from the first and second sets of hydrocyclones may be passed to a settling and/or storage tank to be recycled onto the first, second and/or third vibratory screens to reduce the overall water consumption of the apparatus.

In one embodiment the first set of hydrocyclones comprises four cyclones arranged in parallel and communicating with a common inlet, common underflow manifold and common overflow manifold.

In one embodiment the second set of hydrocyclones comprises two cyclones arranged in parallel and communicating with a common inlet, common underflow manifold and common overflow manifold.

The further hydrocyclone may be mounted adjacent the second set of hydrocyclones, above the deck of the third vibratory screen.

The apertures in the deck of the second vibratory screen may be larger than those of the third vibratory screen to increase the throughput of the second vibratory screen.

According to a second aspect of the present invention there is provided a method of washing and grading sand and aggregate material comprising passing a feed material onto a first vibratory screen having multiple decks, wherein a separate grade of washed and graded aggregate is discharged a downstream end of each deck of the first vibratory screen, pumping water and undersize material from a sump of the first vibratory screen into a first set of hydrocyclones, comprising a plurality of cyclones arranged in parallel, passing the underflow from the first set of hydrocyclone onto a second vibratory screen, discharging a sand product from a downstream end of a deck of the second vibratory screen, pumping water and undersize material from a sump of the second vibratory screen into a second set of hydrocyclones, comprising a plurality of cyclones arranged in parallel, and passing the underflow from the second set of hydrocyclone onto a third vibratory screen, discharging a sand product from a downstream end of a deck of the third vibratory screen, pumping water and undersize material from a sump of the third vibratory screen into a further hydrocyclone and passing the underflow from the further hydrocyclone onto the deck of the third vibratory screen.

The method may comprise the further step of passing the overflow from the further hydrocyclone to material on the first vibratory screen.

These and other objects, advantages and features of the invention will become apparent upon review of the following specification in conjunction with the drawings.

BRIEF DESCRIPTION OF THE DRAWINGS

An apparatus for washing and grading sand and aggregate in accordance with an embodiment of the present invention will now be described, with reference to the accompanying drawings, in which:—

DETAILED DESCRIPTION OF THE PREFERRED EMBODIMENTS

Figure 1:
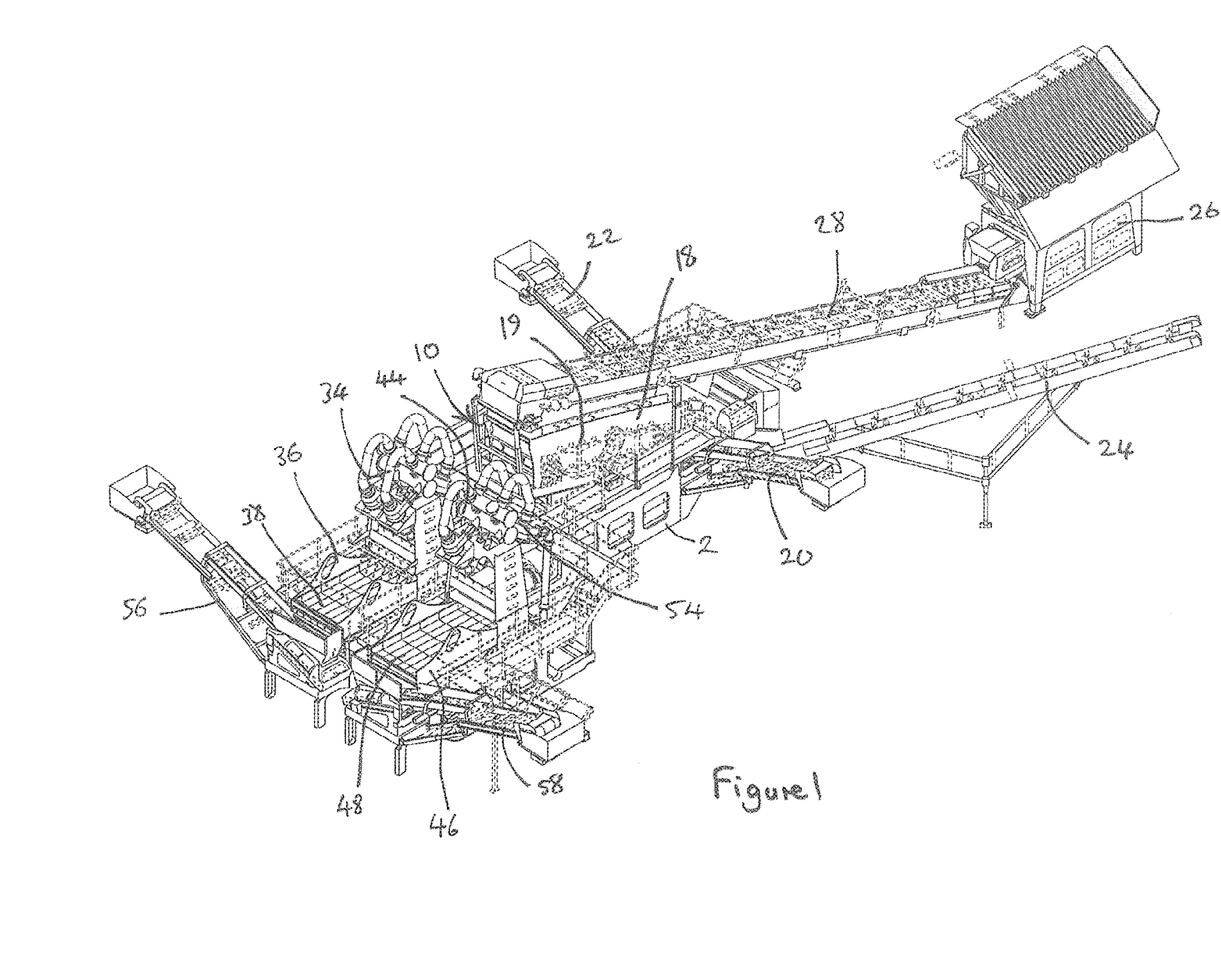
FIG. 1 is a perspective view of an apparatus for washing and grading sand and aggregate in accordance with an embodiment of the present invention.
Figure 2:
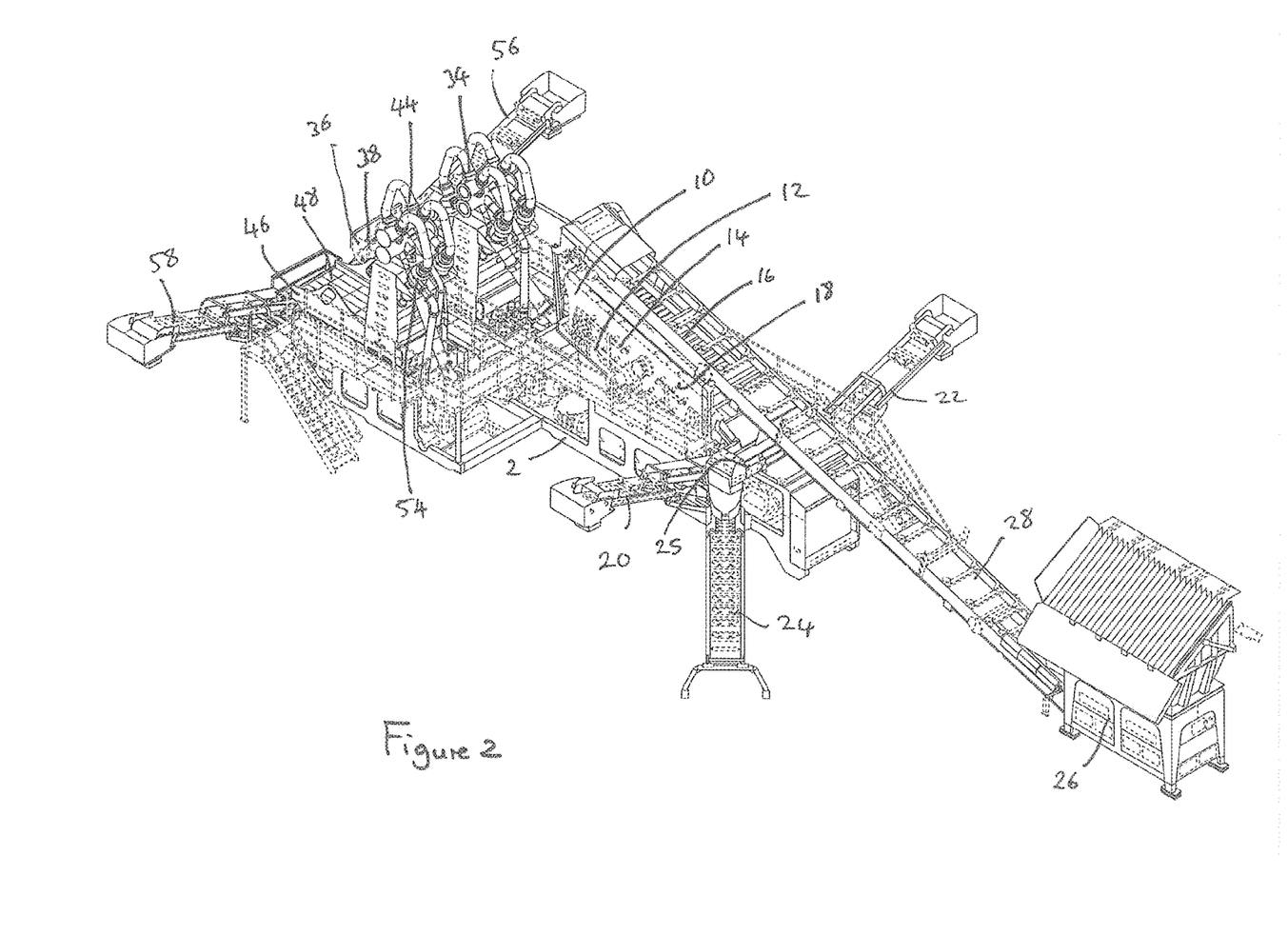
FIG. 2 is a further perspective view of the apparatus of FIG. 1.
Figure 3:
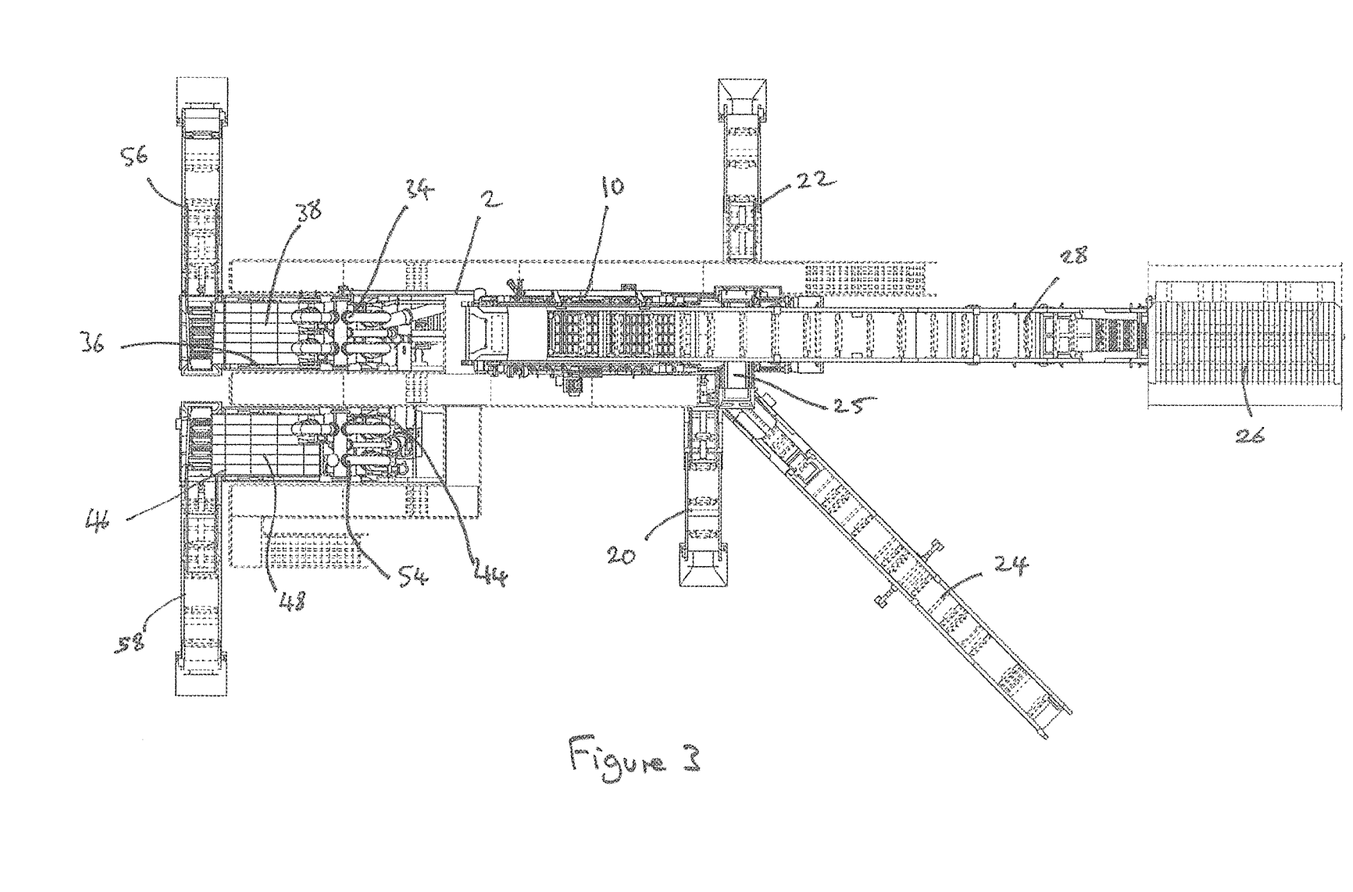
FIG. 3 is a plan view of the apparatus of FIG. 1.

Referring now to the drawings and the illustrative embodiments depicted therein, an apparatus for washing and grading sand and aggregate includes an elongate chassis 2 having a multi-deck aggregate washing and grading screen 10 mounted at a first end of the chassis 2 for receiving a feed material and for producing several different grades of washed aggregate product, such as shown in FIGS. 1-3. In the illustrated embodiment the multi-deck aggregate screen 10 is a triple deck screen for producing three separate grades of aggregate. The triple deck aggregate screen 10 may be of the type disclosed in GB 2,523,658, which is incorporated herein by reference in its entirety, comprising substantially parallel lower 12, intermediate 14 and upper 16 decks mounted on a frame 18 defined by a pair of substantially parallel side walls interconnected by transversely extending bridging members and incorporating a vibration generator or generating means for imparting vibratory motion to the screen 10. Each of the lower, intermediate and upper screen decks 12, 14, 16 may comprise polyurethane mats having a plurality of slots or apertures formed therein for water and/or undersize particles to pass through. The openings or slots in the upper deck are larger than those of the intermediate deck, which are in turn larger than those of the lower deck.

Each deck 12, 14, 16 of the aggregate screen 10 has a downward slope from an upper receiving end to a lower discharge end at which over-sized material (relative to the screen deck concerned) can be discharged. Material of a size in excess of the size of the screening apertures of each deck of the aggregate screen is discharged under gravity action from the lower end of the respective deck onto a respective stockpile conveyor 20, 22, 24, whereas under-sized material able to pass downwardly through the screening apertures of the respective screen deck falls under gravity onto the deck below, where the further screening action takes place, or into a sump in the case of the lower deck.

A first stockpile belt conveyor 20 is mounted on the chassis 2 arranged to receive over-sized material from the discharge end of the lower deck 12. The first stockpile conveyor 20 extends laterally from the chassis 2 to a first side of the chassis 2, substantially perpendicular to a longitudinal axis of the aggregate grading screen 10, a loading end of the first stockpile 20 conveyor being located directly beneath the discharge end of the lower deck 12 of the aggregate grading screen 10.

A second stockpile conveyor 22 is mounted on the chassis 2 to receive over-sized material from the discharge end of the intermediate deck 14, such as via a first delivery chute adapted to receive over-size material from the intermediate deck of the aggregate grading screen 10. The second stockpile conveyor 22 extends laterally from the chassis 2, perpendicular to the aggregate grading screen 10, to a second side of the chassis 2, opposite the first side of the chassis 2, such that the second stockpile conveyor 22 extends parallel to and in an opposite direction to the first stockpile conveyor 20.

A third stockpile conveyor 24 is arranged to receive over-sized material from the discharge end of the upper deck 16. A transfer belt conveyor 25 may be provided adjacent the discharge end of the upper deck 16, the transfer conveyor 25 being arranged to deliver over-sized material from the discharge end of the upper deck 16 onto the third stockpile conveyor 24.

The third stockpile conveyor 24 may extend at an angle of approximately 45° to the first stockpile conveyor 20 and to the longitudinal axis of the chassis 2. The angle of the third stockpile conveyor 24 may be adjustable with respect to the chassis 2.

The first, second and third stockpile conveyors 20, 22, 24 may be foldable against the sides of the chassis 2 for transportation and/or may be removable from the chassis 2 (in particular in the case of the third stockpile conveyor).

The feed material may be transferred onto the upper deck 16 of the aggregate screen 10 via a feed hopper 26 and associated feed conveyor 28.

Each side wall of the aggregate screen 10 may be made up of a laminated assembly of steel plates, such as disclosed in GB 2,505,483, which is incorporated herein by reference in its entirety.

Spray bars 19 are mounted above the each deck 12, 14, 16 of the aggregate screen for adding water to the material thereon.

A pump 32 (shown schematically in FIG. 4) is associated with the sump 30 beneath the lower deck 12 of the aggregate screen 10 for pumping water and undersize material to the common inlet of a first set of hydrocyclones 34 mounted at a second end of the chassis 2, opposite the first end, and above a first sand washing and grading screen 36. In the embodiment shown, the first set of hydrocyclones 34 comprises four separate cyclones arranged in parallel with a common inlet, common overflow manifold and common underflow manifold. However, more or less cyclones may be used depending upon the desired throughput. The first set of hydrocyclones 34 washes and dewaters the sand transferred from the sump 30 of the aggregate screen 10, removing a least a proportion of fine contaminants, such as silt and clay, from the sand.

Figure 4:
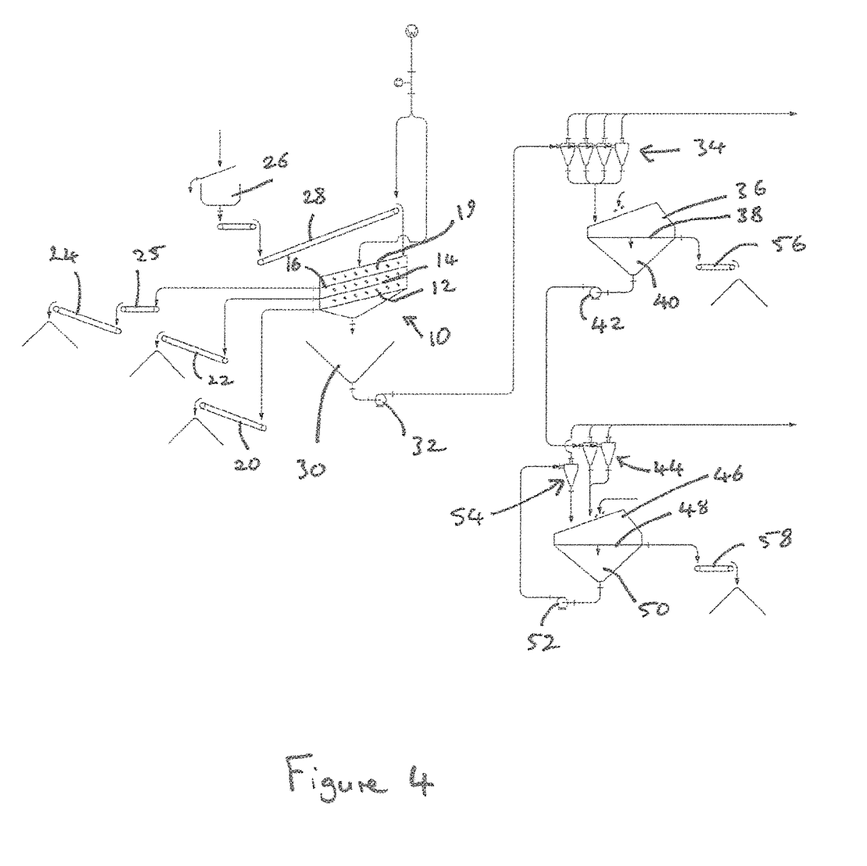
FIG. 4 is a schematic view of the operation of the apparatus of FIG. 1.

Washed sand and some water passes out of the underflow of each cyclone of the first set of hydrocyclones 34 while water and fine contaminants pass out of the overflows thereof. In the embodiment shown the first set of hydrocyclones comprises two pairs of angles cyclones arranged symmetrically about a vertical axis.

The first set of hydrocyclones 34 is mounted above the first sand washing and grading screen 36 such that the underflow from the cyclones of the first set of hydrocyclones 34 is delivered onto the deck 38 of the first sand washing and grading screen 36. Undersize material and water passes through the deck 38 of the first sand washing and grading screen 36 and is collected in a sump 40 beneath the deck 38.

A pump 42 is associated with the sump 40 of the first sand washing and grading screen 36 for pumping the slurry of water and aggregate therefrom into the inlets of a second set of hydrocyclones 44. The second set of hydrocyclones 44 is mounted above a second sand washing and grading screen 46, mounted alongside the first sand washing and grading screen 36. In the embodiment shown the second set of hydrocyclones 44 comprises two cyclones arranged in parallel. However, more or less cyclones may be used depending upon the desired throughput.

The underflow from the cyclones of the second set of hydrocyclones 44 is delivered onto the deck 48 of the second sand washing and grading screen 46.

Undersize material and water collected in a sump 50 below the deck 48 of the second sand washing and grading screen 46 is pumped via a pump 52 to the inlet of a further hydrocyclone 54, mounted alongside the second set of hydrocyclones 44, and the underflow from the further hydrocyclone 54 is delivered back onto the deck 48 of the second sand washing and grading screen 46.

The provision of the further hydrocyclone 54 provides a further pass of the sand on the second sand washing and grading screen 46 through a cyclone, maximising the removal of unwanted fines, such as silt, from the sand product or products produced by the second sand washing and grading screen 46.

Optionally, the apertures in the deck 38 of the first sand washing and grading screen 36 are larger than those of the second sand washing and grading screen 46 to reduce the load on the first sand washing and grading screen 36 by allowing a larger proportion of the sand and fines to wash through the deck 38 of the first sand washing and grading screen 36. A courser sand product may be first sand washing and grading screen 36 while a finer sand product may be produced on the second sand washing and grading screen 46.

Respective conveyor assemblies 56, 58 are mounted on the chassis 2 with inlet ends located beneath a discharge ends of the decks 38, 48 of the first and second sand washing and grading screens 36, 46 for receiving oversize material thereon. The conveyor assemblies 56, 58 comprise first and second outwardly diverging belt conveyors extending transversely from the chassis 2 in opposite directions, for delivering two sand products to separate stockpiles or a single sand product to one or both sides of the chassis 2.

At least a portion of the overflow from both the first and second sets of hydrocyclones 34, 44 and/or the further hydrocyclone 54 may be passed into the sumps 40, 50 of the first and second sand washing and grading screens 36, 46 and also possibly the sump 30 of the aggregate screen 10, as required to maintain a sufficient water content in the material in the sumps to allow efficient operation of the pumps associated therewith. A remaining portion of the overflow from the first and second sets of hydrocyclones 34, 44 may be passed to a thickener tank or settling pond, wherein the silt and other fine contaminants may be removed to allow the water to be reused or suitably disposed of.

The overflow from the further hydrocyclone 54, being relatively clean, may be passed back to the aggregate screen 10 to be supplied to the spray bars 19 of the decks 12, 14, 16 thereof, thus significantly reducing water consumption of the apparatus.

Each side wall of each of the first and second sand washing and grading screens 36, 46 may be made up of a laminated assembly of steel plates, such as disclosed in the above-referenced GB 2,505,483, incorporated herein.

FIG. 4 illustrates the use of the apparatus to produce three washed aggregate products and one or two sand products.

Raw material to be processed is delivered into the feed hopper 26 and conveyed via the feed conveyor 28 onto the upper deck 26 of the triple-deck aggregate screen 20. Water is added to the material via spray bars 19 mounted over the upper deck 16 of the aggregate screen 10, and may be at least partly supplied from the overflow of the further hydrocyclone 54. Oversize material passes down and over and downstream end of the upper deck 16 to be received upon the transfer belt 25 conveyor before passing onto the third stockpile conveyor 24 to be delivered onto a stockpile as a first washed aggregate product.

Undersize material passes though the upper deck 16 onto the intermediate deck 14 of the triple-deck aggregate screen 10 for further grading, further water being added onto the intermediate deck 14 via further spray bars 19. Oversize material passes down and over the downstream end of the intermediate deck 14 and onto the second stockpile conveyor 22 to be delivered onto a respective stockpile as a second washed aggregate product having a smaller size than the first aggregate product.

Undersize material passing through the intermediate deck 14 is further graded on the lower deck 12 of the triple-deck aggregate screen 10. Oversize material from the lower deck 12 passes down and over the downstream end of the lower deck 12 and onto the first stockpile conveyor 20 to be delivered onto a respective stockpile as a third washed aggregate product having a smaller size than the second aggregate product.

Remaining undersize material, comprising sand and fine contaminants, and water is collected in the sump 30 beneath the lower deck 12 of the aggregate screen 10. This slurry of contaminated sand and water is pumped, via pump 32, to the common inlets of the cyclones of the first set of hydrocyclones 34, wherein water and a proportion of the fine contamination is removed in the overflow of the hydrocyclones and an underflow, containing sand and some of the water, drops onto the deck 38 of the first sand washing and grading screen 36. Undersize material and water passes through the apertures in the deck 38 to be collected in the sump 40 while oversize material, as a washed sand product, passes over the deck 38 and is collected on the conveyor assembly 56 to be conveyed to a stockpile.

The slurry collected in the sump 40 of the first sand washing and grading screen 36 is pumped, via pump 42, to the common inlets of the second set of hydrocyclones 44. The underflow from the second set of hydrocyclones is delivered onto the deck 48 of the second sand washing and grading screen 46, whereupon water and undersize material passes through the deck 48 to be collected in the sump 50 therebelow, such undersize material and water collected in the sump 50 of the second sand washing and grading screen 46 being pumped, via pump 52, to the inlet of the further hydrocyclone 54 to remove any remaining fine contaminants from the slurry before delivering sand from the underflow of the further hydrocyclone 54 back onto the deck 48 of the second sand washing and grading screen 46.

Cleaned and substantially dewatered sand product is delivered from the deck 48 or the second sand washing and grading screen 46 onto the conveyor assembly 58 for stockpiling.

The overflows from the first and second sets of hydrocyclones 34, 44 and more especially from the further hydrocyclone 54, may be passed to a suitable settling and/or storage tank before being passed back to the spray bars 19 of the aggregate screen 10 and to the decks 38, 48 of the first and second sand washing and grading screens 36, 46, greatly reducing the water consumption of the apparatus.

The invention is not limited to the embodiment described herein but can be amended or modified without departing from the scope of the present invention, which is intended to be limited only by the scope of the appended claims as interpreted according to the principles of patent law including the doctrine of equivalents.

The invention claimed is:

1. An apparatus for washing and grading sand and aggregate comprises:
    a first vibratory screen having a plurality of vertically stacked decks for producing a plurality of aggregate products therefrom, and a sump for collecting undersize material comprising sand and water from the plurality of decks;
    a first set of hydrocyclones arranged to receive undersize material and water from the sump of the first vibratory screen, the first set of hydrocyclones comprising a plurality of cyclones arranged in parallel, each having an inlet receiving the undersize material and water from the sump of the first vibratory screen;
    a second vibratory screen having a deck for producing at least one sand product and a sump beneath the deck for receiving undersize material and water from the deck of the second vibratory screen, the deck of the second vibratory screen receiving an underflow from each cyclone of the first set of hydrocyclones;
    a second set of hydrocyclones arranged to receive undersize material and water from the sump of the second vibratory screen, the second set of hydrocyclones comprising a plurality of cyclones arranged in parallel, each having an inlet receiving the undersize material and water from the sump of the second vibratory screen;
    a third vibratory screen having a deck for producing at least one sand product and a sump beneath the deck for receiving undersize material and water from the deck of the third vibratory screen, the deck of the third vibratory screen receiving an underflow from each cyclone of the second set of hydrocyclones; and
    a further hydrocyclone receiving undersize material and water from the sump of the third vibratory screen, an underflow from the further hydrocyclone being delivered onto the deck of the third vibratory screen.

2. The apparatus of claim 1, wherein the first vibratory screen is mounted on a first end of a chassis of the apparatus, and the second and third grading screens are mounted on a second end of the chassis, opposite the first end.

3. The apparatus of claim 1, wherein the first vibratory screen comprises a triple deck screen for producing three separate grades of aggregate.

4. The apparatus of claim 3, wherein the first vibratory screen comprises substantially parallel upper, intermediate and lower decks mounted on a frame defined by a pair of substantially parallel side walls interconnected by transversely extending bridging members and incorporating a vibration generator for imparting vibratory motion to the screen.

5. The apparatus of claim 4, wherein each deck of the first vibratory screen is inclined downwardly from an upper receiving end to a lower discharge end at which over-sized material can be discharged.

6. The apparatus of claim 4, wherein each of the upper, intermediate and lower screen decks incorporates a plurality of slots or apertures formed therein for water and/or undersize particles to pass through, the openings or slots in the upper deck being larger than the openings or slots of the intermediate deck, and the openings or slots in the intermediate deck are larger than the openings or slots of the lower deck.

7. The apparatus of claim 4, wherein a first stockpile belt conveyor is mounted on the chassis and arranged to receive over-sized material from the discharge end of the lower deck of the first vibratory screen, the first stockpile conveyor extending laterally from the chassis to a first side of the chassis, substantially perpendicular to a longitudinal axis of the first vibratory screen, a loading end of the first stockpile conveyor being located directly beneath the discharge end of the lower deck of the aggregate grading screen, a second stockpile conveyor being mounted on the chassis to receive over-sized material from the discharge end of the intermediate deck of the first vibratory screen, the second stockpile conveyor extending laterally from the chassis, perpendicular to the first vibratory screen, to a second side of the chassis, opposite the first side of the chassis, such that the second stockpile conveyor extends parallel to and in an opposite direction to the first stockpile conveyor, a third stockpile conveyor being arranged to receive over-sized material from the discharge end of the upper deck of the first vibratory screen, the third stockpile conveyor extending at an angle of approximately 45° to the first stockpile conveyor and to the longitudinal axis of the chassis.

8. The apparatus of claim 1, wherein each of the second and third vibratory screens comprise a frame mounted upon the chassis via resilient mounts and upon which is mounted a screening surface having a plurality of apertures therein for grading and dewatering aggregate, the frame being provided with vibration generator for imparting vibration to the frame, and a sump beneath the screening surface for receiving water and undersize material therefrom.

9. The apparatus of claim 1, wherein the sump of the first vibratory screen is associated with at least one pump configured to pump water and undersize material therefrom to a respective inlet of each cyclone of the first set of hydrocyclones, the sump of the second vibratory screen being associated with a pump configured to pump water and undersize material therefrom to a respective inlet of each cyclone of the second set of hydrocyclones.

10. The apparatus of claim 1, wherein an overflow from the further hydrocyclone, being relatively clean, is supplied to material on the first vibratory screen.

11. The apparatus of claim 1, wherein the first set of hydrocyclones comprises four cyclones arranged in parallel and communicating with a common inlet, a common underflow manifold and a common overflow manifold.

12. The apparatus of claim 1, wherein the second set of hydrocyclones comprises two cyclones arranged in parallel and communicating with a common inlet, a common underflow manifold and a common overflow manifold.

13. The apparatus of claim 12, wherein the further hydrocyclone is mounted adjacent the second set of hydrocyclones, above the deck of the third vibratory screen.

14. The apparatus of claim 1, wherein the apertures in the deck of the second vibratory screen are larger than those of the third vibratory screen.

15. A method of washing and grading sand and aggregate material comprising:
    passing a feed material onto a first vibratory screen having multiple decks, wherein a separate grade of washed and graded aggregate is discharged a downstream end of each deck of the first vibratory screen;
    pumping water and undersize material from a sump of the first vibratory screen into a first set of hydrocyclones comprising a plurality of cyclones arranged in parallel;
    passing the underflow from the first set of hydrocyclone onto a second vibratory screen;
    discharging a sand product from a downstream end of a deck of the second vibratory screen;
    pumping water and undersize material from a sump of the second vibratory screen into a second set of hydrocyclones comprising a plurality of cyclones arranged in parallel;
    passing the underflow from the second set of hydrocyclone onto a third vibratory screen;
    discharging a sand product from a downstream end of a deck of the third vibratory screen;
    pumping water and undersize material from a sump of the third vibratory screen into a further hydrocyclone; and
    passing the underflow from the further hydrocyclone onto the deck of the third vibratory screen.

16. The method of claim 15, comprising the step of passing the overflow from the further hydrocyclone to material on the first vibratory screen.

* * * * *